(No Model.)

W. Y. LAMBERT.
PNEUMATIC TIRED WHEEL.

No. 537,537. Patented Apr. 16, 1895.

WITNESSES:
G. Clark
W. H. James

INVENTOR:
W. Y. Lambert.
Per Robert C. Phillips
Attorney

THE NORRIS PETERS CO., PHOTO-LITHO., WASHINGTON, D. C.

UNITED STATES PATENT OFFICE.

WILLIAM YATES LAMBERT, OF SHEFFIELD, ENGLAND.

PNEUMATIC-TIRED WHEEL.

SPECIFICATION forming part of Letters Patent No. 537,537, dated April 16, 1895.

Application filed February 14, 1894. Serial No. 500,153. (No model.) Patented in England August 4, 1893, No. 14,974.

*To all whom it may concern:*

Be it known that I, WILLIAM YATES LAMBERT, a subject of the Queen of Great Britain, residing at Sheffield, in the county of York, England, have invented a new and useful Improvement in Pneumatic-Tired Wheels, (for which I have obtained a patent in Great Britain, No. 14,974, bearing date August 4, 1893,) of which the following is a specification.

My invention relates to an improved method of attaching and securing the edges of a divided cover of a pneumatic tire to a wheel rim, and it consists in forming on the divided edges of the cover beads or enlargements, in forming in the wheel rim circumferential grooves or channels adapted to receive the beads or enlargements on the divided edges of the cover, and of mounting in the wheel rim a series of radial studs carrying locking plates on the outer face of the rim the said locking plates being adapted to engage—when turned transversely with respect to the rim—with the beads or enlargements on the divided edges of the cover and when turned longitudinally with the rim to be free of the said beads or enlargements, the object being to provide a more simple and ready means of fixing and securing the covers of pneumatic tires to wheels rims than is at present known. I attain this end in the manner illustrated by the accompanying drawings, in which—

Figure 1:
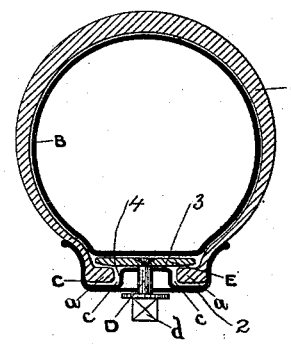
Figure 2:
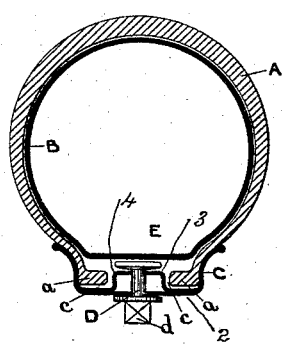
Figure 3:
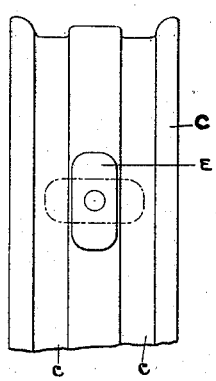
Figure 4:
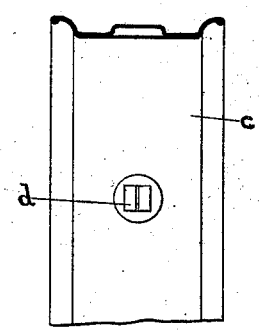

Figure 1 is a view in transverse section of a pneumatic tire and wheel rim embodying my invention. Fig. 2 is a view in transverse section of a wheel rim showing one of the locking plates turned to lie longitudinally with the wheel rim. Fig. 3 is a broken view in plan of the outer face of the wheel rim showing one of the locking plates. Fig. 4 is a broken view in plan of the inner face of the wheel rim showing the operating head of one of the studs carrying the locking plates; and Figs. 5 and 6 are views in transverse section and plan respectively showing another form my invention may assume.

Similar letters and numerals denote similar parts throughout the several views.

The cover A of the tire is made of rubber reinforced with canvas in the well-known manner and it has a bead or enlargement $a$ formed on each edge. These beads or enlargements are preferably made of a hard quality of rubber, or they are stiffened by the insertion of canvas or any other suitable unyielding material. The air tube B is of the usual construction and is fitted with any suitable valve for inflation and deflation. The wheel rim C of an outer channeled plate 2 and an inner plate 3 secured thereto and having a central upwardly-projecting channel 4. Grooves $c$ are formed between the sides of the plate 2 and the sides of the channel 4.

Figure 5:
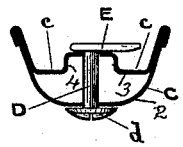
Figure 6:
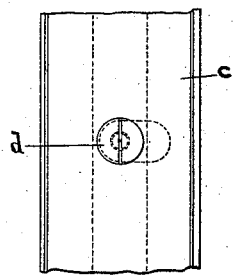

In the wheel rim C are radially mounted a series of studs D, D, &c., having either square heads $d$ as shown by Figs. 1, 2, 3, and 4, or screw-driver button heads $d$ as shown by Figs. 5 and 6 whereby they can be rotated. On to the outer end of each of the studs D, on the outer face of the wheel rim C is riveted or otherwise attached a plate E which is preferably made of a rectangular shape as shown in the accompanying drawings. These plates are of such a length that when they lie transversely with respect to the rim they overhang the grooves or channels $c, c$, in the wheel rim and so confine the beads or enlargements $a, a$, on the edges of the cover A therein as shown by Fig. 1, but when they are turned to lie longitudinally with respect to the rim as shown by Figs. 2 and 3 they are clear of the grooves or channels $c, c$, in the wheel rim and thereby the cover of the tire is free to be removed from the wheel rim. The heads $d$ of the studs D, are so shaped or marked that they denote the position of the locking plates within the tire.

As it is only necessary to detach one edge of the cover from the wheel rim to get at the air tube, the locking plates E may be made to engage with one edge of the cover only as shown by Figs. 5 and 6 so that while one edge of the cover is released from the wheel rim the other is still secured thereto in which case the said plates are arranged to engage alternately with the edges of the cover.

I wish it to be particularly understood that I do not limit myself to the precise details of construction hereinbefore described and illustrated by the accompanying drawings, but that I hold myself at liberty to make such changes and alterations as fairly fall within the spirit and scope of my invention.

I am aware that the covers of pneumatic tires have already been made with beads or enlargements on their edges, and also that wheel rims have been made with grooves adapted to receive the said beaded or enlarged edges of the covers of pneumatic tires. I do not therefore claim such broadly, but What I do claim, and desire to secure by Letters Patent, is—

In a wheel, the combination, with a rim consisting of an outer channeled plate 2 and an inner plate 3 secured therein and having a central projecting channel 4, forming the grooves *c;* of a cover having beads on its edges resting in the said grooves *c;* and the locking plates secured on pins having their upper and lower ends journaled in the said plates 2 and 3 and provided with heads for turning them, and securing the beads in their grooves, substantially as set forth.

WILLIAM YATES LAMBERT.

Witnesses:
 W. H. MORTON,
 GEO. OUTRAM.